United States Patent Office 3,475,377
Patented Oct. 28, 1969

3,475,377
SPANDEX FIBERS BASED ON SEGMENTED POLYURETHANES CHAIN EXTENDED WITH TWO DIFFERENT CHAIN EXTENDERS
Friedrich Karl Rosendahl, Leverkusen-Schlebusch, Wilhelm Thoma, Cologne-Flittard, and Harald Oertel and Heinrich Rinke, Leverkusen, Germany, assignors to Farbenfabriken Bayer Aktiengesellschaft, Leverkusen, Germany, a corporation of Germany
No Drawing. Filed Dec. 6, 1965, Ser. No. 511,965
Claims priority, application Germany, Dec. 8, 1964,
F 44,638
Int. Cl. C08g 22/04
U.S. Cl. 260—75                9 Claims

ABSTRACT OF THE DISCLOSURE

Elastic filaments having an essential structure of a segmented polyurethane are prepared by reacting an excess of an organic diisocyanate with a linear polyhydroxyl compound having terminal hydroxyl groups, a first chain extending agent selected from the group consisting of glycols, diamines, hydrazines, polyhydrazide compounds, polycarboxylic acids and bis-(aminoxy)-$\alpha$:$\omega$-alkanes and a second chain extending agent having the general formula

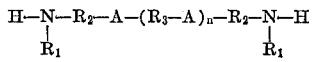

wherein A is an amide group, a urethane group, a urea group, an acyl semicarbazide group, an acyl carbazinic ester group, a hydrazodicarbonamide group or a hydrazodicarboxylic ester amide group, $R_1$ is hydrogen, alkyl, alkylsulfonate, $R_2$ and $R_3$ are alkylene, cycloalkylene, arylene or aralkylene and $n$ is a whole number from 0 to 5.

---

This invention relates to polyurethane elastomers, filaments thereof and to a process for the production of the polyurethane elastomers in solution.

It is already known to prepare polyurethane elastomers by the diisocyanate polyaddition process from high molecular weight, substantially linear polyhydroxy compounds, polyisocyanates and organic chain lengthening agents which have reactive hydrogen atoms by reacting them in highly polar organic solvents. In particular, these polyurethane elastomers prepared in highly polar organic solvents can also be formed into filaments and fibres which can be used for numerous textile purposes, especially in the corsetry and underwear industry, for bathing wear, elastic garments or stockings, if desired as core spun elastomer yarns mixed with filaments or staple fibre yarns and as staple fibre admixture to non-elastic fibres for the purpose of improving the wearing properties of fabrics which are otherwise not highly elastic.

The elastic polyurethane filaments have various advantages over rubber threads; thus they are obtainable in practically any degree of fineness for textile purposes, they have greater tensile strengths and abrasion resistance and in many cases higher tensional forces, they are largely resistant to cosmetic oils and dry cleaning solvents and they have a high resistance to oxidation and ozone. Moreover, in contrast to rubber threads, polyurethane elastomer filaments can be dyed relatively easily with certain classes of dyestuffs, for example disperse dyes.

Numerous compounds have been described as chain lengthening agents for the preparation of polyurethane elastomers by the process described above, for example butanediol, 1:4-phenylene-bis-hydroxyethyl ether, ethylene diamine, ethanolamine, dichlorobenzidine, hydrazine, carbodihydrazide and many other glycols, diamines and hydrazides.

Apart from these chain lengthening agents, diamines which contain amide groups in addition to the $\omega$:$\omega'$-amino groups have been proposed for the reaction of NCO preadducts to form elastomers.

However, it was found that such reaction products from NCO preadducts and diamines with, for example, oxamide groups as sole chain lengthening agents, which are obtained by reaction in highly polar organic solvents such as dimethyl-formamide, are turbid, viscous gels which it is almost impossible to convert into homogeneous, clear solutions even at elevated temperatures. Although a high content of additional NH.CO groups capable of formation of hydrogen bridge bonds, for example oxamide groups, may be highly desirable in bifunctional chain lengthening agents for example from the point of view of high softening temperatures, high tensional forces, high tensile strength and good elastic properties of the elastomers, too high a content in these groups has a very deleterious effect, especially if, for example, bis-($\beta$-aminoethyl)-oxamide is used as the exclusive chain lengthening agent, because the reaction products are then only insufficiently soluble in the solvents suitable for spinning. Fibre raw materials of this kind are then difficult, if not impossible to convert in a reproducible manner into high grade elastic threads with constant mechanical, elastic and dyeing properties.

The present invention relates to a process for the preparation of polyurethane elastomers by the diisocyanate polyaddition process by reacting high molecular weight, substantially linear polyhydroxy compounds and polyisocyanates with organic chain lengthening agents having reactive hydrogen atoms in polar, organic solvents, in which primary or secondary diamines which contain at least one —NH—CO— group or one

—NH—CO—NH—NH—CO—NH— group in which two or more NH—CO— groups are separated by a bivalent organic radical are added as chain lengthening agents in quantities of 3 to 50 mol percent in addition to the known organic chain lengthening agents. In addition, the chain lengthening agents may also contain tertiary nitrogen atoms and/or sulphonate groups in quantities such that the finished polyurethane elastomer contains 10 to 400 milliequivalents of tertiary nitrogen and/or sulphonate groups per kg. of solid substance of elastomer. These diamines contain amide, urethane, urea, acylsemicarbazide, acylcarbazinic ester, hydrazodicarbonamide and hydrazodicarbonamidic ester groups and correspond to the general formula

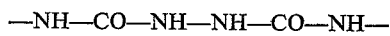

wherein A denotes amide (—$NR_0$—CO— or
—CO—$NR_0$—)
urethane-(—$NR_0$—CO—O— or O—CO—$NR_0$),
urea (—$NR_0$CO—NH— or —NH—CO—$NR_0$), acyl semicarbazide ($NR_0$—CO—NH—NH—CO— or
—CO—NH—NH—CO—$NR_0$)
acyl carbazinic ester (—O—CO—NH—NH—CO— or
OC—NH—NH—CO—O—)
hydrazodicarbonamide
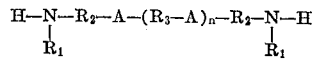
hydrazodicarboxylic ester amide
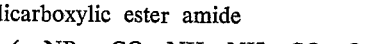
or —O—OC—NH—NH—CO—$NR_0$) groups, $R_0$ denotes hydrogen or an alkyl sulphonate group, $R_1$ denotes hydrogen, alkyl or an alkylsulphonate group, $R_2$ denotes an alkylene, cycloalkylene, arylene, aralkylene radical and the radical $R_2$ may be interrupted by hetero atoms such as oxygen, sulphur or nitrogen and/or closed to a ring and/or substituted by sulphonate groups, $R_3$ denotes an alkylene, cycloalkylene, arylene, aralkylene radical, and may be interrupted by hetero atoms such as oxygen sulphur and nitrogen and/or closed to a ring and/or substituted by sulphonate groups and $n$ denotes zero or a whole number from 1 to 5.

Due to the additional introduction of amide, urethane, urea, acylsemicarbazide, acylcarbazinic ester, hydrazodicarboxylic amide and hydrazodicarboxylic amide ester groups, the NH.CO groups, which are in any case already present due to the usual chain lengthening reaction and which are capable of forming hydrogen bridge bonds, can be increased in the desired manner, thereby leading to high strength and highly elastic formed articles having e.g. low permanent elongation, low loss in tension and high softening temperatures.

An object of this invention is to provide new synthetic linear polyurethane elastomers and filaments thereof having improved properties. In general, the linear polyurethane elastomers and the filaments thereof have an essential linear structure, comprising a segmented polyurethane from a NCO-prepolymer, a chain extending agent and a further chain-extending agent consisting of a primary or secondary amine, said segmented polyurethane containing units of the formula $$-\underset{R_1}{N}-R_2-A-(R_2-A)_n-R_2-\underset{R_1}{N}$$

wherein A denotes amide ($NR_0$—CO— or

—CO—$NR_0$—)

urethane (—$NR_0$—CO—O— or O—CO—$NR_0$), urea (—$NR_0$—CO—NH— or —NH—CO—$NR_0$), acyl semicarbazide ($NR_0$—CO—NH—NH—CO— or

—CO—NH—NH—CO—$NR_0$)

acyl carbazinic ester (—O—CO—NH—NH—CO— or OC—NH—NH—CO—O—), hydrazodicarbonamide (—$NR_0$—CO—NH—NH—CO—$NH_0$—)

hydrazodicarboxylic ester amide (—$NR_0$—CO—NH—NH—CO—O— or —O—OC—NH—NH—CO—$NR_0$) groups, $R_0$ denotes hydrogen or an alkyl sulphonate group, $R_1$ denotes hydrogen, alkyl or an alkyl sulphonate group, $R_2$ denotes an alkylene, cycloalkylene, arylene, aralkylene radical and the radical $R_2$ may be interrupted by hetero atoms such as oxygen, sulphur or nitrogen and/or closed to a ring and/or substituted by sulphonate groups, $R_3$ denotes an alkylene, cycloalkylene, arylene, aralkylene radical, and may be interrupted by hetero atoms such as oxygen, sulphur and nitrogen and/or closed to a ring and/or substituted by sulphonate groups and $n$ denotes zero or a whole number from 1 to 5. These units are connected by —CO—NH— groups, forming linkages in the segmented polyurethane.

The advantage of the process of the invention for the preparation of polyurethane elastomers with the use of chain lengthening agents which correspond to the above general formula thus lies in the possibility of modifying in the desired manner those chain segments which contain NH.CO groups, which are the segments mainly responsible for determining the elastic properties of elastomers by using additional chain lengthening agents containing CO.NH groups. However, the diamines corresponding to the general formula can only be employed up to a quantity of about 50 mol percent of the total quantity of chain lengthening agents because otherwise the solutions of the elastomers would tend to turbidity and gel formation due to the solubility limit being exceeded by the quantity of hydrogen bridge bonds in the elastomers, and the elastomer solutions would consequently no longer be stable in storage or capable of being worked up.

Another advantage of the process of including diamines of the above general formula as chain lengthening agents consists in that tertiary nitrogen atoms and/or sulphonate groups can be introduced into the elastomer molecule with the groups capable of forming hydrogen bridge bonds. These nitrogen atoms and sulphonate groups enhance the dyeability of the elastic articles which are formed such as threads and fibres with acid and basic dyestuffs, chrome dyes or after-chroming dyes.

Owing to the special structure of the polyurethane elastomers, which consist of up to at least about 70% of amorphous constituents (constituents of high molecular weight polyhydroxy compounds), certain dyestuffs (e.g. disperse dyes) are taken up relatively easily by these elastomer threads but can also diffuse very easily out of the elastomer substance again, for example on washing, which generally results in poor (wet) fastnesses of such dyeings. The same applies to dyeings obtained with so-called acid dyes, chrome dyes or after-chroming dyes, which also manifest insufficient fastness, frequently accompanied by insufficient absorption rates and depths of colour of the dyeings.

However, if the polyurethane elastomer fibres are to be used on a broad basis for textile purposes, the achievement of deep and fast dyeings is an indispensable requirement. This applies especially to the use of important groups of dyes such as acid dyes, metal complex dyes or chrome dyes, which can produce fast and deep colour tones e.g. on polyamides which are preferentially employed in conjunction with elastic polyurethane threads.

The introduction of tertiary nitrogen atoms and/or sulphonate groups into the elastomer molecule by way of the chain lengthening agents of the general formula overcomes these disadvantages very satisfactorily.

The following products, among others, are suitable for the reaction of NCO preadducts in polar organic solvents with chain lengthening agents corresponding to the general formula: ω:ω'-diaminoamides from ω-aminocarboxylic acid esters or lactams and diamines, for example bis-(α-aminoacetic acid)-ethylenediamide, bis-(ε-aminocaproic acid)-hexane-diamide, α-aminoacetic acid-β-aminoethylamide, ω:ω'-diamino-amides from diamines and dicarboxylic acid esters for example bis-(β-aminoethyl-succinamide), the reaction product of γ:γ'-diaminopropyl-N-methylamine and succinic acid ester $$H_2N-(CH_2)_3-\underset{CH_3}{N}-(CH_2)_3-NHCO-(CH_2)_3-CONH(CH_2)_3-\underset{CH_3}{N}-(CH_2)_3-NH_2$$

the reaction product of 1:6-hexanediamine-3-sulphonic acid sodium with succinic acid ester $$H_2N-(CH_2)_3-\underset{SO_3Na}{CH}-(CH_2)_2-NH-CO-(CH_2)_2-CO-NH-(CH_2)_2-\underset{SO_3Na}{CH}-(CH_2)_3-NH_2$$

Further examples of ω-amino-carboxylic acid ester- or lactam components for obtaining ω:ω'-diaminoamides are as follows: Ethyl ester of α-aminoacetic acid, methyl ester of γ-aminobutyric acid, ethyl ester of ε-aminocaproic acid, ε-aminocaprolactan among others; examples of diamine components are as follows: Ethane diamine, propane-1:2- and 1:3-diamine, butane-1:4-diamine, hexane-1:6-diamine, γ:γ'-diaminopropyl-N-methylamine, γ:γ'-diaminopropyl ether, piperazine, γ:γ'-diaminopropyl-piperazine, 1:4- and 1:3-cyclohexanediamine, 1:3-xylylene diamine, 1:3-phenylenediamine, 1-amino-3-methylaminopropane, N:N'-dimethylethylenediamine, γ:γ'-diaminopropyl-N-methylamine-(N,γ)-butylsulphonate

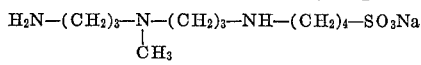

γ:γ'-diaminopropylpiperazine-(N,γ)-butylsulphonate

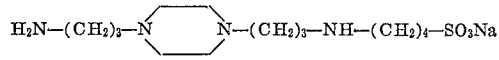

ethanediamine-N-butylsulphonate, - N - propylsulphonate, hexanediamine - N - butylsulphonate, 1:5-cyclohexanediamine-N-butylsulphonate, 1:6-hexanediamine-3-sulphonic acid (the sulphonates mentioned may be present as alkali metal salts, as NH₄- or quaternary ammonium salts).

The following are examples of bifunctional acid components: Esters, specially the phenylesters and acid chlorides of carbonic acid and dicarboxylic acids (except di-carboxyl acids with two adjacent carbonyl groups e.g. oxalic acid) such as malonic, succinic, adipic, terephthalic and isophthalic acid, 1:4-cyclohexanedicarboxylic acid, N-methylamino diacetic acid, N-methylaminodipropionic acid, ether dipropionic acid, hydroquinone-ether diacetic acid and others.

The reaction of the amino acid esters or lactams with diamines in the molar ratio of 2:1 or 1:1 is carried out under aminolytic conditions; the reaction of the diamine and the dicarboxylic acid component (molar ratio at least 2 mols. diamine:1 dicarboxylic acid component) is also carried out under aminolytic conditions or by the Schotten-Baumann reaction. Any oligomeric mixtures formed are used as such for chain lengthening after determination of the equivalent weight. Aminonitriles such as β-cyanoethylamine may also be reacted with amino acid esters, lactams or dicarboxylic acid components. The reductionof the CN groups then leads to diaminoamides. The amino group may initially be blocked by protective groups which are easily split off such as the carbobenzoxy group.

ω:ω'-Diaminourethanes are obtained from amino alcohols which are blocked in the amino group and diisocyanates, followed by liberation of the amino group, for example 4:4'- diphenylurethane-bis-(carbamidic acid-β-aminoethyl)-ester from carbobenzoxyethanolamine and 4:4'-diphenylmethane diisocyanate followed by hydrogenating splitting of the carbobenzoxy group; by reaction of carbobenzoxyalkanolamines with nitro- or nitrile isocyanates, e.g. γ-aminopropyl-carbamidic acid-β-aminoethyl ester from carbobenzoxyethanolamine and β-cyanoethyl isocyanate, by subsequent hydrogenating splitting off the carbobenzoxy radical and reduction of the nitrile group or by reaction of cyanohydrins or hydroxyalkyl nitriles with isocyanates or nitro- or nitrile monoisocyanates followed by reduction of the nitrile or nitro groups, e.g. 1:6 - hexane-bis-(carbamidic acid-γ-aminopropyl)-ester; further, by reaction of diamines, especially diamines having a protected amino group, or of amino nitriles with bis-chlorocarbonic acid esters or monochlorocarbonic acid esters of cyanohydrins or hydroxyalkylnitriles, e.g. the reaction of 2 mols of β-aminopropionitrile with hydroquinone-bis-chlorocarbonic acid ester followed by reduction of the nitrile group to form bis-(γ-amino-propyl-carbamidic acid hydroquinone)-ester.

ω:ω'-Diaminoureas are obtained from diamines, especially diamines having a protected amino group, or from aminonitriles with phosgene, carbonic acid esters or diisocyanates, followed by reduction of the nitrile groups, e.g. the reaction product of 2 mols. of β-aminopropionitrile and 1 mol. of hexanediisocyanate, or from diamines and bis-carbamidic acid phenyl esters with splitting off of phenols and the use of a considerable excess of diamine (about 4:1 followed by distilling off the phenol that has been split off and the excess diamine), e.g. the reaction product of γ:γ'-diaminopropyl-N-methylamine and hexane-bis-carbamidic acid phenyl ester

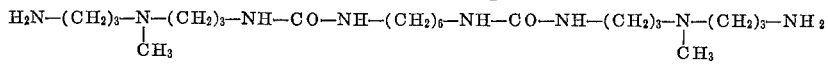

the reaction product of hexanediamine and diphenyl carbonate, namely ω:ω'-diaminohexylurea, the reaction product of N-methylpropanediamine-1:3 and hexane-bis-carbamidic acid phenyl ester. In general, the diamines listed under "diamides" can be reacted with bis-carbamidic acid phenyl esters derived e.g. from hexanediamine, 1:4-cyclohexanediamine, piperazine, 4:4'-diaminodiphenyl-methane, 4:4'-diaminodibenzyl-2:2'-disulphonic acid sodium among others.

ω:ω'-Diamino-acylsemicarbazides can be prepared from dicarboxylic acid hydrazides and diamines, e.g. from the phenol splitters of adipic acid hydrazide and γ:γ'-diaminopropyl-N-methylamine

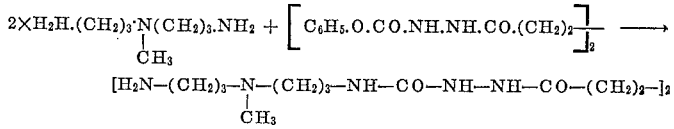

from carbamidic acid phenyl esters of amino nitriles and dicarboxylic acid hydrazides followed by reduction of the nitrile groups, from amino acid phenyl esters and bis-semicarbazides, e.g. from amino acetic acid phenyl ester and 4:4'-bis-semicarbazidebenzyl-2:2'-disulphonic acid sodium, from ω-nitrile-semicarbazides (these are obtained from ω-nitrile-carbamidic acid phenyl esters and hydrazine) and esters of amino acids followed by reduction of the nitrile group.

ω:ω'-Diaminoacyl-carbazinic acid esters are prepared from amino acid esters and bis-carbazinic acid esters, e.g. ε-aminocaproic acid phenyl ester and butane-1:4-carbazinic acid ester

from ω-nitrile-carbazinic acid esters (these are obtained from ω-nitrilechlorocarbonic acid esters and hydrazine) and amino acid esters followed by reduction of the nitrile group.

ω:ω' - Diamino - hydrazodicarbonamides are obtained from phenol splitters of bis-semicarbazides and diamines or aminonitriles followed if desired by reduction of the nitrile groups, from hydrazodicarboxylic acid phenyl esters by reaction with at least 2 mols. of a diamine (the diamine components are listed under diamino amides) e.g.

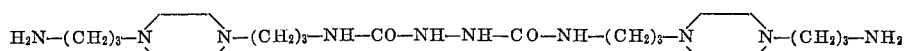

ω:ω'-diamino-hydrazodicarboxylic acid ester amides from phenol splitter of bis-carbazinic acid esters and diamines or aminonitriles, if necessary followed by reduction of the nitrile groups, or from bis-semicarbazides and ω-cyanoalkyl-chlorocarbonic acid esters followed by reduction of the nitrile groups; from amino acid phenyl esters and bis-semicarbazides, for example from aminoacetic acid phenyl ester and 4:4'-bis-semicarbazide-benzyl-2:2'-disulphonic acid sodium, from ω-nitrile semicarbazides (these are obtained from ω-nitrile carbamidic acid phenyl esters and hydrazine) and amino acid esters followed by reduction of the nitrile group.

Substantially linear polyhydroxy compounds having substantially terminal hydroxyl groups and a molecular weight of 500 to 5000 and melting points preferably below about 60° C., are suitable for building up polyurethane elastomers by the diisocyanate polyaddition process; specific examples are polyesters of polycarboxylic acids and polyhydric alcohols, polyester amides, polyethers, polyacetals, poly-N-alkylurethanes and mixtures thereof; further, appropriate copolymers for example with ester-, ether-, acetal-, amide-, urethane-, N-alkylurethane- and urea groups, the melting points of the high molecular weight polyhydroxy compounds being preferably below 45° C. to ensure good elastic and low temperature properties. The polyhydroxy compounds may also be modified with less than equivalent quantities of diisocyanates, single or multiple pre-lengthening taking place. The preferred molecular weight is in the region of about 800 to 3000. Suitable high molecular weight polyhydroxy compounds have been mentioned, for example, in U.S. patent specification 129,964 and U.S. patent specification 306,271.

Especially suitable are polyesters of adipic acid and if desired mixtures of dialcohols having preferably more than 5 carbon atoms, since polyesters of this kind have relatively good resistance to hydrolysis; also suitable are polyethers, preferably polytetramethylene ether diols, which may if desired be used as mixed polyethers, for example by incorporating a smaller quantity of propylene oxide or ethylene oxide by polymerisation. According to an earlier proposal of the present applicants, especially advantageous properties such as great fastness to light are obtained with polyether derivatives in which the terminal OH groups have been replaced by an

—OCON(alkyl).CH$_2$(CH$_2$)$_x$.OH group ($x \geq 1$)

Diisocyanates used for the reaction with the high molecular weight polyhydroxy compounds are, for example, those mentioned in the above-mentioned patent specifications. Especially suitable are diphenylmethane-4:4'-diisocyanate, diphenyldimethylmethane - 4:4'-diisocyanate, the isomeric toluylene diisocyanates, also aliphatic diisocyanates such as hexane-1:6-diisocyanate or cyclohexane-1:6-diisocyanate.

The diisocyanates are reacted with the high molecular weight polyhydroxy compounds in the ratio of about 1.5:1 to 3:1. The reaction is carried out in the melt or in inert solvents such as dioxane, benzene, chlorobenzene or the like at temperatures of about 40 to 120° C., preferably 70 to 100° C., and the reaction times employed are such that a substantially linear preadduct having free NCO groups is obtained which on chain lengthening with approximately equivalent quantities of chain lengthening agents yields a substantially linear polymer which is still soluble in solvents such as dimethylformamide or dimethyl sulphoxide. The viscosities of the elastomer solutions which have a solids content of about 15 to 30% should be in the region of 10 to 1500 poises/20° C.

A modification in the structure of the preadduct which manifests itself after the chain lengthening reaction by the formation of elastomers of higher modulus and in some cases higher melting point and perhaps slightly reduced elongation at break can be achieved by employing low molecular weight (molecular weight slightly less than 250) diols, such as ethylene glycol, butanediol, hydroquinone-bis-hydroxyethylether in addition to the high molecular weight polyhydroxy compounds in the reaction with the diisocyanates (about 10 to 150% of the OH content of the higher molecular weight polyhydroxy compounds).

Suitable chain lengthening agents are the diamines of the general formula employed according to the invention, which are explained by numerous examples and which are employed in addition to the known organic chain lengthening agents such as glycols, diamines, hydrazines, polyhydrazide compounds, polycarboxylic acids and bis(aminoxy)-$\alpha$:$\omega$-alkanes.

Whereas the reactions of the preadducts with the chain lengthening agents containing hydroxyl groups and carboxyl groups (water glycol, polycarboxylic acids) proceed relatively slowly, the chain lengthening agents which carry terminal NH$_2$ groups generally react very rapidly with the NCO preadducts, and for this reason it is preferable not to operate with free hydrazine or diamines but with the carbazinic acids or amino carbonates produced by the addition of CO$_2$ or to employ a multi-stage process in which an excess of chain lengthening agent is initially employed and only thereafter to adjust the desired degree of polymerisation or desired viscosity of the solutions, in order thereby to avoid the difficulties arising from the high reactivity of the chain lengthening agents (German Auslegeschrift 1,157,386).

The incorporation of the diamines of the general formula to be employed according to the invention into the polyurethane elastomer by reacting the preadducts with the chain lengthening agents can be carried out by known methods or many different modifications thereof, depending on the type of starting materials and the nature of the process.

If there is a considerable difference between the reaction velocities of the diamines to be employed according to the invention and the known chain lengthening agents such as dihydrazides or diols, which may even be used to a predominant extent, then the molecular structure can be influenced by the manner and sequence of addition of the chain lengthening agents. If mixtures of the diamines to be employed according to the invention and glycols are used as chain lengthening agents and these mixtures are reacted with preadducts, then a chain lengthening reaction preferably first takes place with the diamine portion, followed by reaction of the glycol portions. By controlled addition, e.g. by slow dropwise addition of the solutions of the diamines of the general formula, e.g. in water, dimethylformamide, dimethylsulphoxide, dioxane, tetrahydrofuran etc. to the reaction mixture of preadducts and glycols or hydrazides or similar chain lengthening agents, a statistically more uniform incorporation of the diamines as the reaction progresses can be achieved.

The elastomer solutions obtained may, if desired, be further reacted, for example if free amine-, hydrazide- or similar end groups reactive to NCO groups are present, they may be reacted with di- or polyisocyanates, resulting in an increase in viscosity; or with monoisocyanates or other "acylating" reaction components such as diethylpyrocarbonate, whereby the reactive end groups are converted into inactive end groups. Conversely, free isocyanate groups which have not yet reacted can be blocked by reacting them with monofunctional compounds such as primary or secondary amines (e.g. dibutylamine) or alcohols, substituted hydrazines (e.g. N:N-dimethylhydrazine), hydrazides or semicarbazides if it is desired to prevent further reaction of the NCO end groups. Pigments, dyestuffs, optical brightening agents, UV absorbents, special light-protective agents, cross-linking agents or similar additives may be added to the elastomers.

The elastomers are formed mainly from their solutions. As solvents it is preferred to use organic solvents which contain amide-, sulphoxide- or sulphonic groups and which have the capacity of entering into strong hydrogen bridge bonds, for example dimethylformamide, diethylformamide, dimethylacetamide, diisopropylpropionamide, formylmorpholine, hexamethylphosphoramide, tetramethylurea, dimethylsulphoxide, tetramethylenesulphone or mixtures thereof. In subordinate quantities, other solvents which are inert to NCO groups may also be employed.

For the production of the elastomer filaments, the usual processes such as wet spinning and dry spinning processes are suitable. The spinning velocities are about 100 to 800 m./min. in the dry spinning process but considerably lower in the wet spinning process (about 5 to 50 m./min.).

Elastomer filaments are produced also by cutting with a foil cutting machine from elastomer foils of about 0.10 to 0.20 mm. in thickness. Elastomer foils or coatings can be obtained on rigid surface or textile fabrics by application with brushes or coating knives or by spraying.

The following examples illustrate and explain the invention in more detail. In these examples, measurements of the properties of filaments or foils are carried out as follows:

TS=tensile strength (in g./den.) on a Wolpert instrument
elg.=elongation (percent) (Wolpert instrument)
TS(B)=tensile strength (in g./den.) at breaking titre (converted).

The elastic properties are determined with Elastotensographs described in Chimia 16, 93–105 (1962).
The following properties are preferably determined:

M300=tension in mg./den. at 300% elongation of the thread at an elongation rate of 400%/min.
M150=tension at 150% elongation in the third release cycle after three times stretching to 300% at a rate of 400%/min.
Tension drop 300%/30″=percent tension drop at elongation to 300% (see above) after 30 seconds pause at 300% elongation.
Permanent elongation=percent permanent elongation after three stretch-release cycles (each time 300% maximum elongation, 400% per min. rate of elongation) 30 seconds after release of the thread.

EXAMPLE 1

1200 g. of a copolyester of adipic acid and hexane-1:6-diol and 2:2-dimethylpentane-1:3-diol (molar ratio of glycols 65/35) with OH number 66 and acid number 1.5 are heated with 298 g. of diphenylmethane-4:4′-diisocyanate and 374 g. of chlorobenzene for 50 minutes at 95–98° C. and then rapidly cooled. NCO content=2.09%.

About 10 g. of solid carbon dioxide are introduced into a solution of 4.13 g. bis-($\omega$-aminohexyl)-urea and 5.45 g. of ethylene diamine in 909 g. of dimethylformamide for formation of the amino carbonate, and 400 g. of the NCO preadduct solution prepared as above are then stirred in and the solution is treated with 25 g. of a 33% $TiO_2$/dimethylformamide pigment paste. By addition of 0.6 g. hexane diisocyanate, the viscosity of the homogeneous elastomer solution rises from 130 to 560 poises/20° C.

By spinning the solution through a 16 aperture spinneret of 0.20 mm. aperture diameter into a dry spinning shaft heated to 220° C. to which air is supplied at 320° C., the elastomer threads are drawn out of the spinning shaft at a speed of 100 m./min. and wound on to spools at the rate of 100, 150 and 250 m./min. respectively i.e. they are stretched by 0%, 50% and 100% respectively. After heating on the spools for one hour at 130° C., the threads are found to have the following properties:

The elastomer solutions prepared by the above process remain in a highly fluid, homogeneous state of solution even when left to stand for several days, and in this state they can subsequently be formed into threads, foils, coatings, etc. By contrast, elastomer solutions obtained from the same NCO preadduct and bis-($\omega$-aminohexyl)-urea as sole chain lengthening agent show a tendency to be converted into a gelled mass even when left to stand for only a short time (about 24 hours), and this mass can no longer be formed at room temperature. When the solution is painted onto glass plates and the solvent is removed by drying in an oven (45 minutes at 70° C. + 45 minutes at 100° C.), clear, highly elastic foils are obtained which have very good mechanical properties:

| | |
|---|---|
| Thickness (mm.) | 0.16 |
| Tensile strength (kg./cm.$^2$) | 718 |
| Elongation (percent) | 645 |
| Tension/20% elongation (kg./cm.$^2$) | 12 |
| Tension/300% | 101 |
| Tear resistance according to Graves (kg./cm.) | 42 |
| Microhardness | 68 |

The bis-($\omega$-aminohexyl)-urea used as chain lengthening agent is prepared as follows:

168 g. of $\omega$-cyano-pentylamine and 165 g. of triethylamine in 450 ml. of chloroform are reacted with 75 g. of phosgene in 450 ml. of chlorofrom at 0–7° C. After the addition of aqueous ammonia, the bis-($\omega$-cyanopentyl)-urea is removed by vacuum filtration. Melting point after redissolving from methanol: 114–116° C.

137 g. of the bis-($\omega$-cyanopentyl)-urea are hydrogenated in 500 ml. of dioxane in the presence of 35 g. of Raney cobalt and 50 ml. of liquid ammonia for 3 hours at 100° C. and a hydrogen pressure of 150 atmospheres above atmospheric pressure. After working up the reaction product and redissolving from benzene, 95 g. of bis-($\omega$-aminohexyl)-urea of M.P. 85–87° C. are obtained.

EXAMPLE 2

400 g. of the NCO preadduct described in Example 1 are stirred at room temperature into a suspension of diaminocarbonates prepared by introducing solid $CO_2$ into a solution of 3.75 g. of bis-($\omega$-aminoethyl)-succinamide and 5.45 g. of ethylene diamine in 902 g. of dimethylformamide, and the reactants intensively mixed. After the addition of 25 g. of $TiO_2$/DMF paste (33% $TiO_2$), a homogeneous, highly fluid elastomer solution is obtained which increases in viscosity from 90 to 550 poises/20° C. by reaction at the terminal amino groups when 0.70 g. of hexane-1:6-diisocyanate is added.

Threads spun by the dry spinning process and heated

| | Titre, den. | TS, g./den. | Elongation, percent | TS (break), g./den. | M300/1 mg./den. | M150/3 mg./den. | Permanent elongation, percent |
|---|---|---|---|---|---|---|---|
| Stretching, percent: | | | | | | | |
| 0 | 218 | 0.77 | 700 | 5.63 | 75 | 20 | 12 |
| 50 | 152 | 0.84 | 500 | 5.02 | 165 | 25 | 11 |
| 100 | 115 | 1.07 | 420 | 5.58 | 240 | 27 | 12 |

The melting point of the elastomer substance is above 265° C.

on spools (1 hour/130° C.) are found to have the following values, depending on the orientation of the threads:

| | Titre, den. | TS, g./den. | Elongation, percent | TS (break), g./den. | M300/1 mg./den. | M150/3 mg./den. | Permanent elongation, percent |
|---|---|---|---|---|---|---|---|
| Stretching, percent: | | | | | | | |
| 0 | 221 | 0.72 | 635 | 5.25 | 81 | 19 | 12 |
| 50 | 152 | 0.98 | 535 | 6.11 | 180 | 20 | 10 |
| 100 | 124 | 1.16 | 450 | 6.36 | 310 | 22 | 10 |

The melting point of the elastomer substance is above 265° C.

Tests on foils obtained as in Example 1 by casting the elastomer solution showed the following mechanical properties:

| | |
|---|---|
| Thickness (mm.) | 0.16 |
| Tensile strength (kg./cm.²) | 718 |
| Elongation (percent) | 677 |
| Tension/20% elongation (kg./cm.²) | 12 |
| Tension/300% | 104 |
| Tear resistance according to Graves (kg./cm.) | 43 |
| Microhardness | 69 |

Preparation of bis-($\omega$-aminoethyl)-succinamide

A solution of 87 g. of diethylsuccinate in 500 ml. of methanol is added dropwise, with stirring, in the course of two hours to 516 g. of ethylene diamine and the mixture then heated to boiling for 2 hours. After filtering off small quantities of a high melting polymer product, the filtrate is concentrated by evaporation in vacuo and the residue is extracted three times with 600 ml. of boiling benzene.

The elastomer solution prepared with bis-($\omega$-aminoethyl)-succinamide is practically unchanged in its viscosity even after several months and has excellent flow so that it is as good as a fresh solution for working up to threads, foils, coatings or the like.

By contrast, elastomer solutions containing more than 50 mol percent of bis-($\omega$-aminoethyl)-oxamide as chain lengthening component can no longer be obtained in a stable form. They change immediately or within a short time into a pasty, non-fluid state, probably due to an excessive tendency to crystallisation, and in this state they are difficult if not impossible to form. If bis-($\omega$-aminoethyl)-oxamide is used as the sole chain lengthening agent in a solids concentration of 20 to 25% in dimethyl formamide solution, crumbly, pasty elastomer solutions are obtained which cannot be formed satisfactorily.

EXAMPLE 3

225 g. of a polyester from hexane-(1:6)-diol and 2:2-dimethylpropane-(1:3)-diol in the ratio of 65:35 and adipic acid having the reaction number 69.5 are dewatered for one hour at 12 mm. Hg, 130° after the addition of 0.3 ml. of a 30% sulphur dioxide solution in dioxane. The anhydrous melt of the polyester is heated with 63.0 g. of 4:4′-diphenylmethane diisocyanate for 45 minutes at 100°. After dissolving the NCO preadduct in 225 g. of anhydrous dioxane, the NCO content is found to be 1.70%.

100 g. of the above described preadduct solution is added dropwise with vigorous stirring at 25° C. into a solution of 1.75 g. of $\omega$:$\omega$′-di-prim.-ditertiaryaminourea of equivalent weight 122 (prepared by the action of 0.10 mol of hexamethylene-bis-carbamidic acid phenyl ester on 1.0 mol of $\gamma$:$\gamma$′-diaminopropyl-N-methylamine at 120° for 2 hours and distilling off the phenol that is split off and the excess $\gamma$:$\gamma$′-diaminopropyl-N-methylamine) and 1.60 g. of carbodihydrazide in 15 g. of water and 130 g. of dimethylformamide. A viscous elastomer solution is obtained. By painting this solution on to glass plates and drying for one hour at 100°, highly elastic foils are produced which are cut up into threads with a foil cutting machine. These threads have the following properties:

| | |
|---|---|
| Titre (den.) | 823 |
| Tensile strength (TS)(g./den.) | 0.59 |
| Elongation (percent) | 580 |
| Modulus M 300 (mg./den.) | 113 |
| Modulus M 150 (mg./den.) | 23 |
| Permanent elongation (percent) | 16 |
| TS break (g./den.) | 4.0 |

The threads can be dyed to deep colours with a red acid dyestuff according to DRP 230,594 (Supramine Red GG, C.I. Acid Orange 19 (14690)) and the 2% dyebath is exhausted practically quantitatively.

100 g. of an NCO preadduct solution obtained by reacting 200 g. of the above-mentioned polyester with 49.4 g. of 4:4′-diphenylmethane diisocyanate in 200 g. of dioxane (1.35% NCO) are stirred at 25° into a solution of 1.85 g. of the above described $\omega$:$\omega$′-di-prim.-di-tertiary urea and 0.75 g. of ethylene diamine in 220 g. of dimethylformamide.

The highly viscous elastomer solution is formed into foils as described and cut up into threads. The melting point of the threads is in the region of 245° (Kofler bench).

| | |
|---|---|
| Titre | 414 |
| TS | 0.49 |
| Elongation | 700 |
| TS break | 3.9 |
| M 300 | 76 |
| M 150 | 19 |
| Permanent elongation | 18 |

EXAMPLE 4

As in Example 3, 100 g. of the NCO preadduct solution described in paragraph 1 of Example 3 are stirred into a solution of 1.45 g. of an $\omega$:$\omega$′ di-prim.-di-tertiary-amino hydrazocarbonamide (bis-[7-amino-(4-aza-methyl)-heptyl]hydrazo-carbonamide), of equivalent weight 109 (prepared by the action of 0.10 mol. of hydrazodicarboxylic acid phenyl ester on 1.0 mol. of $\gamma$:$\gamma$′-diaminopropyl-N-methylamine at 110° for 2 hours and distilling off the phenol that is split off and the excess amine) and 1.60 g. of carbodihydrazide in 15 g. of water and 130 g. of dimethylformamide. The highly viscous solution produced is then cast into foils in the usual manner, from which threads are obtained which have the following properties:

| | |
|---|---|
| Titre | 644 |
| TS | 0.68 |
| Elongation | 610 |
| TS break | 4.85 |
| M 300 | 95 |
| M 150 | 23 |
| Permanent elongation | 20 |

The threads can be died to deep colours with the red acid dyestuff used in Example 3.

EXAMPLE 5

75 g. of the polyester of hexane-1:6-diol, 2:2-dimethylpropane-1:3-diol and adipic acid described in Example 3 are treated with sulphur dioxide and dewatered as described in the said example. The anhydrous melt of the polyester is heated to 100° for 45 minutes with 21.0 g. of 4:4′-diphenylmethane diisocyanate and then dissolved in 75 g. of anhydrous dioxane. The NCO content is 1.80%.

100 g. of the NCO preadduct solution are stirred at 50° C. into the solution of 1.30 g. of an $\omega$:$\omega$′-diprim.-tetra - tertiary - aminohydrazocarbonamide of equivalent weight 125 (prepared by the action of 0.1 mol. of hydrazodicarboxylic acid phenyl ester on 0.75 mol. of $\gamma$:$\gamma$′-diaminopropylpiperazine at 110° for 2 hours and distilling off the phenol that is split off and the excess $\gamma$:$\gamma$′-diaminopropylpiperazine) and 1.82 g. of carbodihydrazide in 15 g. of water and 150 g. of dimethylformamide. The resulting highly viscous solution is formed into foils which are cut up into threads. The threads can be dyed in deep colours with the red acid dyestuff used in Example 3.

EXAMPLE 6

200 g. of the polyester described in Example 3 are heated with 48.4 g. of diphenylmethane diisocyanate for 60 minutes at 100° C. as described there. After dissolving the melt of the NCO preadduct in 200 g. of dioxane, the NCO content is found to be 1.29%.

100 g. of the NCO preadduct solution are stirred at 25° C. into the solution of 2.95 g. of ω:ω'-di-prim.-di-tertiary-aminosuccinamide of equivalent weight 93.5 (prepared by the action of 0.1 mol. of diethyl succinate on 1.0 mol. of γ:γ'-diaminopropyl-N-methylamne at 100° C. for 3 hours and distilling off the alcohol that is split off and the excess amine) and 0.47 g. of ethylene diamine in 195 g. of dimethylformamide. The viscous elastomer solution is formed into foils. These have the following properties:

| | |
|---|---|
| Thickness (mm.) | 0.12 |
| TS (kg./cm.$^2$) | 407 |
| Elongation (percent) | 600 |
| TS break (kg./cm.$^2$) | 2850 |
| Tensional force (20%) (kg./cm.$^2$) | 14 |
| Tensional force (300%) (kg./cm.$^2$) | 63 |
| Tear resistance according to Graves (kg./cm.) | 26 |
| Microhardness | 58 |

The threads cut from the foils can be dyed very satisfactorily with the dyestuff described in Example 3 and having the following mechanical and elastic properties:

| | |
|---|---|
| Titre (den.) | 442 |
| TS (g./den.) | 0.57 |
| Elongation (percent) | 720 |
| TS break (g./den.) | 4.65 |
| Permanent elongation (percent) | 8 |
| Tension drop (percent) | 12 |

100 g. of the NCO preadduct solution described in paragraph 1 of Example 3 are run into the solution of 1.42 g. of an ω:ω'-di-prim.-di-tertiary amino succinamide of equivalent weight 93.5 (described in the previous section of this example) and 1.60 g. of carbodihydrazide in 15 g. of water and 150 g. of dimethylformamide, vigorously stirring meanwhile. The viscous elastomer solution is cast into foils which have the following properties:

| | |
|---|---|
| Thickness | 0.10 |
| TS | 620 |
| Elongation | 620 |
| TS break | 4500 |
| Tensional force 20% | 17 |
| Tensional force 300% | 119 |
| Tear resistance | 44 |
| Microhardness | 62 |

EXAMPLE 7

100 g. of an NCO preadduct solution described in paragraph 2 of Example 3 are run at 20° C., with vigorous stirring, into a solution of 1.93 g. of bis-(β-aminopropyl)succinamide of equivalent weight 122 (prepared by the action of 0.10 mol. of diethylsuccinate on 1.0 mol. of propylene-1:2-diamine at 100° C. for 3 hours and distilling off the alcohol that is split off and the excess diamine) and 0.54 g. of ethylene diamine in 165 g. of dimethylformamide.

The viscous elastomer solution is formed into foils and cut up into threads which have the following properties:

| | |
|---|---|
| Titre | 669 |
| TS | 0.58 |
| Elongation | 705 |
| TS break | 4.7 |
| Permanent elongation | 16 |
| Tension drop | 14 |
| Melting point | 240° |

EXAMPLE 8

100 g. of an NCO preadduct solution described in paragraph 2 of Example 3 are stirred into a solution of 2.70 g. of an ω:ω'-diaminourea (obtained by reacting 0.10 mol. of 1:6-hexamethylene-bis-carbamic acid phenyl ester with about 2 mols of N-methylpropylene diamine-1:3 at 120° for 2 hours and distilling off the phenol that is split off and the excess diamine) and 0.43 g. hydrazine hydrate in 170 g. of dimethylformamide. The viscous elastomer solution is cast into foils and these are cut up into threads which have the following properties:

| | |
|---|---|
| Titre | 720 |
| TS | 0.52 |
| Elongation | 680 |
| TS break | 4.1 |
| Permanent elongation | 19 |
| Tension drop | 13 |

EXAMPLE 9

150 g. of the polyester described in Example 3 are heated with 42.0 g. of 4:4'-diphenylmethane diisocyanate for 50 minutes at 100°. The NCO preadduct then dissolved in 150 g. of dioxane has an NCO number of 1.80%

100 g. of this NCO preadduct solution are added with vigorous stirring at 25° C. to a solution of 1.02 g. of hydrazine hydrate and 1.40 g. of the sodium salt of bis-(6-aminohexyl-3-sulphonic acid)-succinamide in 15 g. of water and 150 g. of dimethylformamide. The highly viscous solution is formed into foils from which threads are cut which have the following properties:

| | |
|---|---|
| Titre | 637 |
| TS | 0.61 |
| Elongation | 590 |
| TS Break | 4.2 |
| M 300 | 91 |
| M 150 | 21 |
| Permanent elongation | 20 |
| Tension drop | 15 |

The threads can be dyed to deep colours with basic dyestuffs, e.g. Astrazon Blue BG (C. I. Basic Blue 3,51005).

To prepare the sodium salt of bis-(6-aminohexyl-3-sulphonic acid)-succinamide, 17.9 g. of diethylsuccinate are added dropwise into the boiling solution of 43.6 g. of 1:6-diamino-3-sulphonic acid sodium in 100 ml. of alcohol, and the reaction mixture is then kept at boiling point for 3 hours. After cooling, the crystals are filtered off under suction, washed with water and dried in vacuo. Yield: about 80%.

EXAMPLE 10

100 g. of the NCO preadduct described in Example 9 are introduced while stirring into a solution of 1.94 g. of carbodihydrazide and 1.00 g. of diamino-adipic acid amide of the potassium salt of γ:γ'-diaminopropyl-N-methylamine-(N',γ)-butyl-sulphonate in 15 g. of water and 150 g. of dimethylformamide at 25° C.

The foils produced from the resulting highly viscous elastomer solution are cut up into threads on which excellent dyeings can be produced with acid and basic dyestuffs, e.g. Supramine Red GG or Astrazon Blue BG, and which have the following mechanical and elastic properties:

| | |
|---|---|
| Titre | 808 |
| TS | 0.65 |
| Elongation | 590 |
| TS break | 4.5 |
| M 300 | 97 |
| M 150 | 20 |
| Permanent elongation | 20 |
| Tension drop | 15 |

The diamino-adipic acid amide of the potassium salt of γ:γ'-diaminopropyl-N - methylamine - (N',γ) - butylsulphonic acid is prepared as follows:

20.2 g. of diethyladipate dissolved in 25 ml. of alcohol are added dropwise into a boiling solution of 56.5 g. of γ:γ'-diaminopropyl-N - methyl - (N',γ) - butyl sulphonic acid in 100 ml. of alcohol. After boiling for one hour, the solution is cooled, the sulphonic acid is converted into the potassium salt with 11.2 g. of caustic potash in 100 ml. of alcohol, and after leaving to stand for 12 hours, the salt is filtered off under suction and dried in vacuo: yield 72%.

EXAMPLE 11

300 g. of a polytetramethylene ether diol (OH number 68) are heated to 90° C. for 35 minutes with 80.3 g. of diphenylmethane-4:4'-diisocyanate and 164 g. of chlorobenzene. NCO content after cooling to room temperature 2.32%.

100 g. of the above NCO preadduct solution are introduced into a solution of 1.89 g. of a diurethane diamine of the following constitution:

$H_2N.(CH_2)_3.O.CO.NH.(CH_2)_6$
—$NH.CO.O.(CH_2)_3.NH_2$ and 2.14 g. of carbohydrazide in 366 g. of dimethylformamide, a homogeneous elastomer solution having a viscosity of 215 poises/20° C. being obtained. The solution is cast into foils which are cut up into threads which have the following properties:

Titre den. _____ 872
Tensile strength g./den. _____ 0.75
Elongation, percent _____ 765
Tensile strength (break) g./den. _____ 6.51
M 300 mg./den. _____ 114
M 150 mg./den. _____ 20
Permanent elongation, percent _____ 20

Preparation of the diurethane diamine 71 g. of β-hydroxy-propionitrile and 84 g. of hexane-1:6-diisocyanate are heated under reflux for 5 hours in 200 g. of dioxane. The dinitrile which crystallises out on cooling (144 g.) has a melting point of 114° C. after recrystallisation from acetone.

100 g. of the diurethane-dinitrile are hydrogenated with 50 g. of Raney cobalt and 600 ml. of dioxane for 4 hours at 75–80° C. to form the diamine which crystallises out after concentration by evaporation, melting point (Kofler bench) 66° C.

EXAMPLE 12

107.5 g. of the NCO preadduct solution from Example 11 are introduced into a solution of 1.56 g. of a diurethane-diamine of the following constitution:

$H_2N.(CH_2)_3.NH.CO.O.(CH_2)_2.O.CO.NH.(CH_2)_3.NH_2$ and 2.14 g. of carbohydrazide in 319 g. of dimethylformamide, a homogeneous, stable elastomer solution of viscosity 256 poises/20° C. being thereby obtained.

After casting into foils and cutting up into threads, the following properties are determined:

Titre den. _____ 879
Tensile strength g./den. _____ 0.89
Elongation, percent _____ 710
Tensile strength (break) g./den. _____ 6.79
M 300 mg./den. _____ 110
M 150 mg./den. _____ 21
Permanent elongation percent _____ 17

Preparation of the diurethane-diamine

A solution of 56.1 g. of ethylene-bis-chloroformic acid ester in 200 ml. of carbon tetrachloride is added dropwise with stirring into a solution of 42 g. of β-aminopropionitrile and 63.6 g. of anhydrous sodium carbonate in 350 ml. of water. The precipitated dinitrile is recrystallised from 1200 ml. of boiling ethanol, M.P. 142° C.

40 g. of the recrystallised dinitrile are hydrogenated with 30° g. of Raney cobalt in 300 ml. of dioxane for 3 hours at 75 to 80° C.

After distilling off the solvent, the diurethane diamine crystallises out; M.P. 56° C. (Kofler bench), equivalent weight 131.

EXAMPLE 13

303 g. of the urea diamine of the following structure

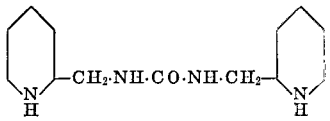

and 1.07 g. of ethylene diamine are dissolved in 280 g. of dimethylformamide and 10 g. of Dry Ice are added. 95 g. of the NCO preadduct described in Example 11 are stirred into the suspension of the carbamates, an elastomer solution having a viscosity of 156 poises/20° C. being produced.

After casting into foils and cutting up into threads, the following properties are determined on the threads:

Titre den. _____ 842
Tensile strength g./den. _____ 0.66
Elongation, percent _____ 804
Tensile strength (break) _____ 6.01
M 300 mg./den. _____ 98
M 150 mg./den. _____ 19

Preparation of the urea diamine 530 g. of 2-cyano-pyridine are hydrogenated in 1.5 l. of methanol with 70 g. of Raney cobalt for 3 hours at 85° C. under a hydrogen pressure of 150 atmospheres above atmospheric pressure to produce 2-aminomethyl-pyridine which is purified by distillation. Yield 400 g., B.P. 83–86° C. at 12 mm. Hg.

108 g. of 2-amino-methyl-pyridine and 107 g. of diphenyl carbonate are heated for one hour at 130° C. When the melt is cold, 500 ml. of methanol are added and the crystallised bis-(2-methyl-pyridine-urea) is filtered off under suction.

107 g. of bis - (2 - methyl-pyridine-urea) were hydrogenated in 500 ml. of dioxane with 30 g. ruthenium/aluminium oxide catalyst for 3½ hours at 120° C. and a hydrogen pressure of 250 atmospheres above atmospheric pressure to produce bis-(2-methyl-piperidyl-urea); M.P. 124–125.

EXAMPLE 14

2000 g. of the mixed polyester described in Example 1 are heated with 520 g. of diphenylmethane 4:4'-diisocyanate and 1080 g. of chlorobenzene for 60 minutes at 95° C. (NCO content of the preadduct=1.97%).

About 40 g. of solid carbon doxide are added to a solution of 13.9 g. of the urea diamine

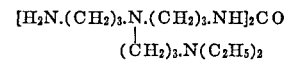

(prepared from 2 mols. of N:N-diethyl, N':N'-bis-(γ-amino-propyl) - propylene - 1:3-diamine, B.P. 154°/0.4 mm. one mol of diphenylcarbonate by heating in a water bath for one hour) and 13.55 g. of ethylene diamine in 1930 g. of dimethylformamide at room temperature to produce the amino carbonates, and 1040 g. of the above described NCO pre-adduct solution are then stirred in, $CO_2$ being then evolved and a highly viscous, clear, homogeneous elastomer solution with a viscosity of 220 poises/20° C. being obtained. After pouring the solution over glass plates and evaporating off the solvent (60 min./100° C.), foils are obtained which are cut up into elastomer threads. These threads have the following properties; Titre: 475 den., tensile strength: 0.65 g./den., Elongation: 675%, Tensile strength (based on the titre at break): 5.0 g./den.

The threads can be dyed to deep colours with 2% blue acid dyestuff Supramine Blue FRW (C.I. Acid Blue 220), the dyebath being exhausted quantitively in the process, and these dyeings have a high fastness to boiling: When boiled 4 times (10 min. each), with distilled water, the dyeings do not run.

What we claim is:

1. An elastic filament having an essential structure of a segmented polyurethane formed by reaction of an excess of an organic diisocyanate with a linear polyhydroxyl compound having terminal hydroxyl groups, a first chain-extending agent selected from the group consisting of glycols, diamines, hydrazines, polyhydrazide compounds, polycarboxylic acids and bis-(aminoxy)-α:ω-alkanes, said diamines being different from the diamines of the second chain-extending agent and from about 3 to about 50 mol percent, based on said first chain-extending agent, of a second chain-extending agent having the general formula

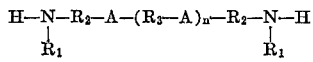

wherein A is an amide group, a urethane group, a urea group, an acyl semi-carbazide group, an acyl carbazinic ester group, a hydrazodicarbonamide group or a hydrazodicarboxylic ester amide group, $R_1$ is hydrogen, alkyl, or alkylsulfonate, $R_2$ is an alkylene group having 1–6 carbon atoms or a group of one of the following formulas:

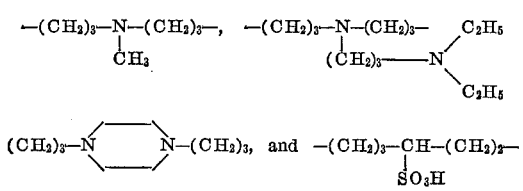

$R_3$ is an alkylene group having 1–6 carbon atoms, and $n$ is 0 or 1.

2. The elastic filament of claim 1, in which said linear polyhydroxyl compound is a polyester of an aliphatic diol and adipic acid, having a melting point of below 60° C. and a molecular weight of 800 to 3000.

3. The elastic filament of claim 1, in which said aliphatic diol is a polytetramethylene ether diol, having a molecular weight of 800 to 3000.

4. The elastic filament of claim 1, in which said organic diisocyanate is a symmetrical aromatic diisocyanate.

5. The elastic filament of claim 4, wherein said symmetrical aromatic diisocyanate is diphenylmethane-4,4'-diisocyanate.

6. The elastic filament of claim 1, wherein the second chain-extending agent is bis-(ω-aminohexyl)-urea.

7. The elastic filament of claim 1, wherein the second chain-extending agent is bis-(ω-aminoethyl)-succinimide.

8. The elastic filament of claim 1, wherein said further chain-extending agent is bis-[7 - amino - (4-azamethyl)-heptyl]hydrazo-carbonamide.

9. The elastic filament of claim 1 wherein said first chain-extending agent is selected from aliphatic diamines, carboxylic acid dihydrazides and hydrazine.

References Cited
UNITED STATES PATENTS

| | | | |
|---|---|---|---|
| 3,305,533 | 2/1967 | Thoma et al. | 260—75 |
| 2,929,804 | 3/1960 | Steuber | 260—77.5 |
| 3,071,557 | 1/1963 | Frazer et al. | 260—32.6 |
| 3,097,192 | 7/1963 | Schilit | 260—75 |
| 3,198,863 | 8/1965 | Lauer et al. | 264—184 |
| 3,267,192 | 8/1966 | Peters | 264—203 |

DONALD E. CZAJA, Primary Examiner

H. S. COCKERAN, Assistant Examiner

U.S. Cl. X.R.

260—77.5